Feb. 1, 1938. C. C. WHITTIER 2,106,782
APPARATUS FOR PRODUCING VITAMIN D
Filed July 5, 1935
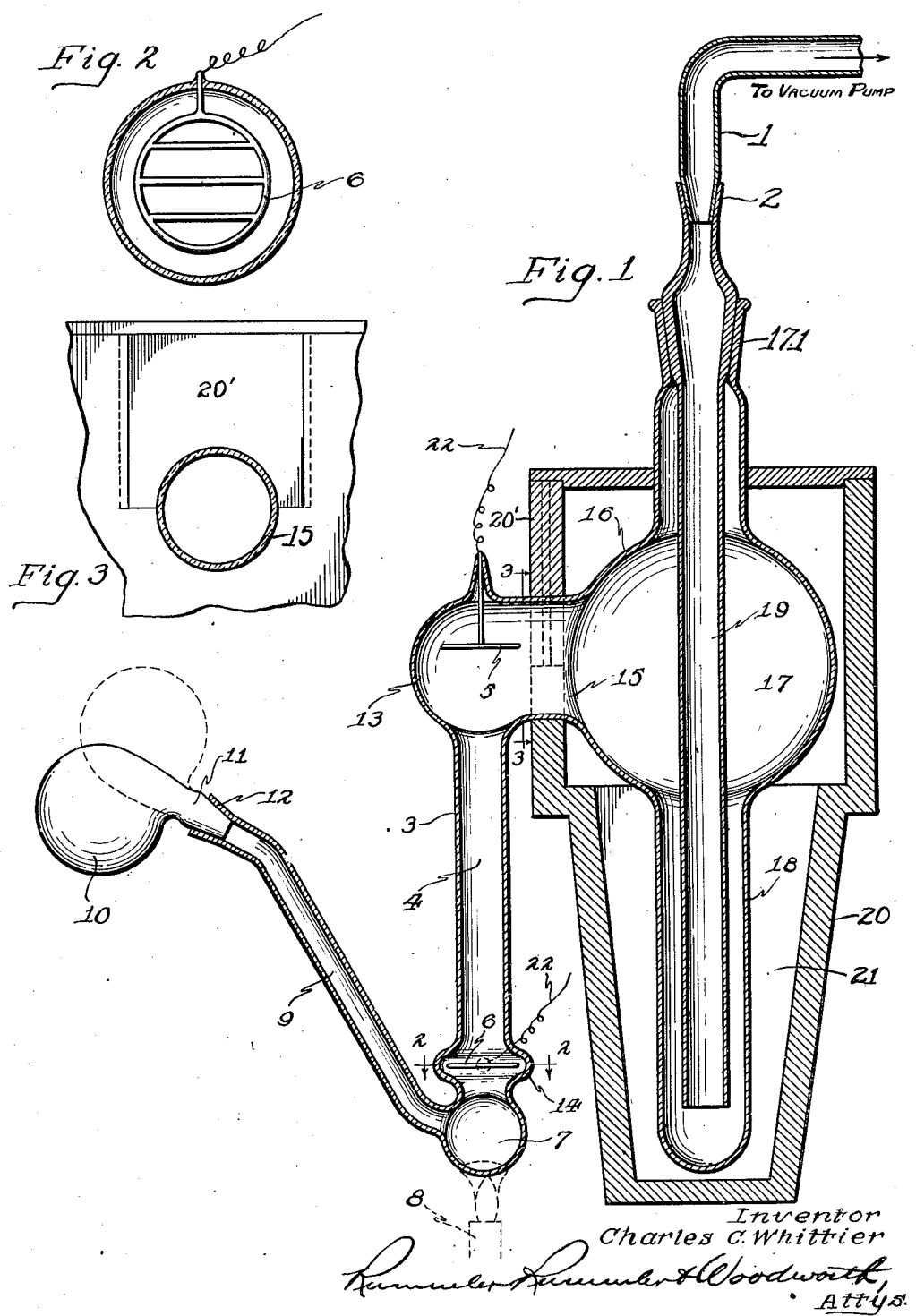
Inventor
Charles C. Whittier Patented Feb. 1, 1938

2,106,782

UNITED STATES PATENT OFFICE 2,106,782

APPARATUS FOR PRODUCING VITAMIN D

Charles C. Whittier, Chicago, Ill., assignor to Nutrition Research Laboratories, Inc., Chicago, Ill., a corporation of Delaware Application July 5, 1935, Serial No. 29,882

4 Claims. (Cl. 204—31)

This invention relates to apparatus for antirachitically activating ergosterol and related substances in the commercial production of vitamin D.

The main objects of this invention are to provide an improved form of apparatus of the type described in my co-pending application for Letters Patent, Serial No. 711,539, filed February 16, 1934, with particular reference to structural improvements and arrangements for enhancing its utility and facilitating the procedure of manufacturing antirachitic products on a commercial scale.

A specific embodiment of this invention is illustrated in the accompanying drawing in which:

Fig. 1 is a vertical section of the complete apparatus with the exception of the vacuum pump and source of electric current.

Fig. 2 is a transverse section taken on the line 2—2 of Fig. 1 and showing a detail of one of the electrical terminals.

Fig. 3 is a detail of a gate in the condenser housing which permits the tube to be readily removed therefrom.

In the form shown in the drawing, the apparatus comprises a vacuum tube preferably formed of glass or other dielectric material and made up of a plurality of communicating sections in which a vacuum is maintained by means of a vacuum pump which may be of any appropriate form and is accordingly represented in the drawing by one of its connecting fittings 1 with which the main tube is connected as for example, by the conical ground joint 2.

The processing tube comprises an upright portion 3 which forms the treating chamber 4 having electrical terminals 5 and 6 at opposite ends thereof. Below the treating chamber 4 is a vaporizing chamber or flask 7 having heating means indicated as the flame from a burner 8.

An inclined inlet duct 9 extends upwardly from flask 7 at one side of the tube 3 and has airtight connection with a supply receptacle 10. The receptacle 10 is preferably of globular or spherical form with a tangentially arranged throat 11 connected to the tube 9. A conically ground slip joint 12, as indicated in Fig. 1, forms an appropriate connection which, when appropriately lubricated, allows the receptacle 10 to be rotated on the joint 12 to control the rate at which the raw material, usually ergosterol, is fed to the flask 7.

The upper end of the tubular portion 3 is enlarged to form a bulb 13 which accommodates the upper terminal 5 which is shown as a plate but may be of the same grid form as terminal 6 and the lower portion of the tubular section 3 is also expanded somewhat at 14 to accommodate the latter terminal. By this arrangement the vapor column in the tube 3 is of less diameter than the projected columnar space spanned or defined by the electrodes and the vaporized ergosterol is, therefore, subjected to a uniform electrical treatment throughout its entire mass as it flows through the treatment chamber, thus insuring that the resulting product of any run will be of uniform potency throughout its mass. The bulb 13 has a somewhat enlarged tubular branch 15 which connects with a larger bulb 16 which, together with a depending branch 18 forms an expanded condenser chamber 17. The vacuum pump communicates with the interior of the condenser 17 through a tube 19 which extends down to the lower portion of the branch 18.

The condenser 17 is surrounded by a jacket or housing 20 whereby the exterior of the condenser may be packed with solid carbon dioxide or other refrigerant or cooling agent, filling the space 21. A gate 20' is slidably mounted as indicated by dotted lines in the side wall of the housing 20, so as to closely fit around the branch 15 and to be removable with the cover of the housing so as to permit the tube to be readily lifted therefrom.

The electrical leads 22 are connected with a source of electric current which may be either direct or alternating. In practice, I use alternating current of 20,000 volts and 10 milliamperes obtained from the secondary circuit of a transformer whose primary on commercial circuit of 110 volts, 60 cycles, has a consumption rate of 200 V. A.

I am aware that good results can be obtained with a wide range of current strength and have used in the commercial production of vitamin D voltages of 20,000 to 100,000 and frequencies of 60 cycles to 13 kilocycles.

In operation, after the device is set up as shown in Fig. 1, the vacuum pump is operated to maintain a vacuum equivalent to ½ millimeter to 1 millimeter of mercury which is maintained by continuous operation of the vacuum pump throughout the process.

A supply of the raw material to be treated, usually ergosterol, is placed in the receptacle 10 and after the desired initial vacuum is attained, the receptacle 10 is gradually rotated to discharge a fine stream of the powdered ergosterol through the inlet tube 9 to the flask 7 where it is vaporized by the heat of the burner 8 whose flame is played upon the walls of the flask 7 in such a way as to avoid excessive heating.

The vapor of ergosterol rises through the chamber 4 where it is subjected to the electrical influence produced by the current from the leads 22. The expression "electrical influence" is intended to describe any and all electrical conditions that are responsible for the antirachitic activation of the vapor as it traverses the space 4. I am as yet unable to identify the dominant factor of this influence, if it be a single factor, since I am aware that antirachitic activation can be produced by exposure to sun light or ultra-violet light as well as by the discharges which take place between electrodes under the circumstances and conditions herein described, and I am unaware of any identifiable factor that is common to all known sources or antirachitic activation of ergosterol.

The term ergosterol is intended to include ergosterol per se, as well as lipin and sterol substances related to it, such as cholesterol, cholesterol freed from ergosterol, zoosterol and the like.

My experiments extending over a long period of time have conclusively demonstrated that vitamin D or antirachitic activation is produced in this apparatus in the complete absence of ultra-violet light which was at one time supposed to be essential to such activation.

In my process, as herein described, the product is of high potency and is not accompanied by many of the undesirable elements usually found in the products of ultra-violet light irradiation methods, such for example as tachosterol, toxisterol and others. Furthermore, destruction of the antirachitic activation by overexposure is not large in my hereindescribed process because it is removed from the zone of treatment as soon as produced. The treatment of the ergosterol vapor can be regarded as quite uniform since the ergosterol on vaporizing flows rapidly through the treating chamber 4 and is immediately deposited on the walls of the condenser 17 and, therefore, is outside of influences which may be destructive. The branch 18 and exhaust tube 19 are extended to sufficient length to avoid any escape of the ergosterol into the exhaust piping or pump. The finished product may be removed from the condenser by brushing it off the walls or by dissolving it in ether.

My product is of relatively constant composition and has stable potency. It has been shown to be beneficial in every way in which antirachitic products are employed and is of such a form as to be readily incorporated in all of the substances in which antirachitic products are used.

The production of vapor of ergosterol is controlled by the rate at which the raw material flows into the flask 7 from receptacle 10 and the rate of heat application by the heater 9. By controlling these two factors the vacuum is controlled and the process is carried out under substantially uniform conditions throughout the treatment of an entire batch of raw material.

It is my belief that the change which occurs in the ergosterol in my process of developing antirachitic potency is due to structural alteration of the atoms of certain elements, as a result of electronic bombardment caused by the flow of electricity through the vapor.

The term "grid" as applied to terminal 6 is intended to signify an arrangement of open spaces and conductor elements such as provides for a free flow of the ergosterol vapor in intimate contact with a distributed arrangement of the electrically charged parts of the terminal, but is not intended to be limited to the identical shape shown in the drawing.

The power consumption per unit of potency of the resulting product is very low compared with that of ultra-violet light irradiation. In my process the electrical conductivity of the vaporized ergosterol is high in the low vacuum used, and an adequate flow of electricity is obtained at low voltage, whereas in ultra-violet lamp treatment a high vacuum and high current consumption are required to produce the rays and then there are enormous losses in transmitting them through the intervening air space and their penetrability into the material is so slight that the material and its conveying medium (usually liquid) have to be handled in a thin film so that such treatment is slow, uncertain and costly.

Although but one specific embodiment of this invention is herein shown and described, it is to be understood that details as set forth may be altered or omitted without departing from the spirit of the invention as defined by the following claims.

I claim:

1. Apparatus for producing antirachitic activation of suitable substances, comprising a tube of dielectric material forming a treating chamber, a vaporizing chamber directly below said tube, an upwardly inclined supply duct leading to said tube, a supply receptacle at the upper end of said supply tube having a tangentially arranged throat and being rotatable about the axis of said supply tube, whereby the flow of material from said throat may be regulated by rotating said supply receptacle, a transversely disposed enlarged tubular branch at the upper end of said treating chamber, a further enlarged expansion chamber communicating with said branch and having a depending arm, an evacuating tube extending through said expansion chamber into said arm, and pumping means for evacuating the apparatus through said evacuating tube.

2. In apparatus for producing vitamin D, a vacuum tube, electric discharge means comprising a pair of spaced electrodes, a treatment chamber between said electrodes and having walls contracted between said electrodes to a diameter not greater than the diameter of the column of electrical activity defined by said electrodes, means for continuously supplying ergosterol vapor to said treatment chamber, and means for exhausting the treated vapor.

3. In apparatus for producing vitamin D, a vacuum tube, electric discharge means comprising a pair of spaced electrodes, a tubular treatment chamber having enlarged bulbous end portions housing the electrodes and being contracted between said electrodes to a diameter not greater than the transverse area of the columnar space defined by said electrodes, means for continuously supplying ergosterol vapor and directing same into contact with one of said electrodes and to said treatment chamber, and means for exhausting the treated vapor.

4. In apparatus for producing vitamin D, a vacuum tube, electric discharge means comprising a pair of spaced electrodes, one of said electrodes extending across the tube and being of open grid construction, a treatment chamber between said electrodes and having walls contracted between said electrodes to a diameter not greater than the diameter of the column of electrical activity defined by said electrodes, means for continuously supplying ergosterol vapor and directing same through said open grid electrode to said treatment chamber, and means for exhausting the treated vapor.

CHARLES C. WHITTIER.